(12) United States Patent
Lalanne et al.

(10) Patent No.: US 9,531,979 B2
(45) Date of Patent: Dec. 27, 2016

(54) IC IMAGE SENSOR DEVICE WITH TWISTED PIXEL LINES AND RELATED METHODS

(71) Applicants: STMICROELECTRONICS (GRENOBLE 2) SAS, Grenoble (FR); STMICROELECTRONICS (CROLLES 2) SAS, Crolles (FR)

(72) Inventors: Frédéric Lalanne, Bernin (FR); Christophe Mandier, Grenoble (FR)

(73) Assignees: STMICROELECTRONICS (GRENOBLE 2) SAS, Grenoble (FR); STMICROELECTRONICS (CROLLES 2) SAS, Crolles (FR)

( * ) Notice: Subject to any disclaimer, the term of this patent is extended or adjusted under 35 U.S.C. 154(b) by 135 days.

(21) Appl. No.: 14/585,704

(22) Filed: Dec. 30, 2014

(65) Prior Publication Data

US 2016/0191758 A1 Jun. 30, 2016

(51) Int. Cl.

| | |
|---|---|
| H04N 3/14 | (2006.01) |
| H04N 5/335 | (2011.01) |
| H04N 5/378 | (2011.01) |
| H04N 5/374 | (2011.01) |
| H04N 5/3745 | (2011.01) |

(52) U.S. Cl.
CPC .............. *H04N 5/378* (2013.01); *H04N 5/374* (2013.01); *H04N 5/3745* (2013.01)

(58) Field of Classification Search
CPC .... H04N 5/2353; H04N 5/3532; H04N 5/353; H04N 5/378; H04N 5/374; H04N 5/3741; H04N 5/3742; H04N 3/1506
USPC ......................... 348/296, 302–304, 308, 324
See application file for complete search history.

(56) References Cited

U.S. PATENT DOCUMENTS

| | | | |
|---|---|---|---|
| 9,392,200 B2 * | 7/2016 | Nitta ................... | H03M 1/1023 |
| 2006/0125941 A1 * | 6/2006 | Baxter ................... | H04N 3/155 |
| | | | 348/302 |
| 2006/0202036 A1 * | 9/2006 | Wang ................. | G06K 7/10722 |
| | | | 235/462.07 |
| 2009/0057544 A1 | 3/2009 | Brodie | |
| 2009/0073297 A1 * | 3/2009 | Cho ........................ | H04N 5/378 |
| | | | 348/308 |
| 2013/0089237 A1 * | 4/2013 | Sargent ................. | G01J 1/0418 |
| | | | 382/103 |
| 2014/0160260 A1 * | 6/2014 | Blanquart .......... | H04N 5/35554 |
| | | | 348/68 |
| 2014/0161363 A1 * | 6/2014 | Sargent .............. | G06K 9/00355 |
| | | | 382/224 |

\* cited by examiner

*Primary Examiner* — Kelly L Jerabek
(74) *Attorney, Agent, or Firm* — Allen, Dyer, Doppelt, Milbrath & Gilchrist, P.A.

(57) ABSTRACT

An IC image sensor device may include image sensing IC pixels arranged in an array, and pixel line pairs coupled to the image sensing IC pixels. The IC image sensor device may include circuitry coupled to the pixel line pairs and configured to operate the array in a global shutter mode. Each pair of the pixel line pairs may include a pair of spaced electrical conductors having a twist.

24 Claims, 14 Drawing Sheets

IC IMAGE SENSOR DEVICE WITH TWISTED PIXEL LINES AND RELATED METHODS

TECHNICAL FIELD

The present disclosure relates to the field of integrated circuits, and, more particularly, to an integrated circuit image sensor device and related methods.

BACKGROUND

Typically, electronic devices include one or more camera modules for providing enhanced media functionality. For example, the typical electronic device may utilize the camera modules for photo capturing and video teleconferencing. In the typical electronic device with multiple camera modules, the primary camera module has a high pixel density and an adjustable focus lens system, while the secondary camera module is front-facing and has a lower pixel density. Also, the secondary camera module may have a fixed focus lens system.

For example, U.S. Patent Application No. 2009/0057544 to Brodie et al, assigned to the present application's assignee, discloses a camera module for a mobile device. The camera module comprises a lens, a housing carrying the lens, and a lens cap over the lens and housing. The camera module includes a barrel mechanism for adjusting the lens.

Each camera module comprises an integrated circuit (IC) image sensor device having a plurality of pixels arranged in an array of rows and columns, a plurality of pixel lines coupled to the plurality of pixels, and readout circuitry coupled to the plurality of pixel lines. In some applications, the IC image sensor device operates in a rolling shutter mode, where each row of the array is sampled sequentially. In other applications, the IC image sensor device operates in a global shutter mode, where all rows are sampled simultaneously. A potential issue with the global shutter mode is that the pixel lines may cause self-interference.

SUMMARY

Generally, an IC image sensor device may include a plurality of image sensing IC pixels arranged in an array, and a plurality of pixel line pairs coupled to the plurality of image sensing IC pixels. The IC image sensor device may include circuitry coupled to the plurality of pixel line pairs and configured to operate the array in a global shutter mode. Each pair of the plurality of pixel line pairs may comprise a pair of spaced electrical conductors having at least one twist therein.

More specifically, the at least one twist may comprise a plurality thereof. Respective twists in adjacent pixel line pairs may be in staggered relation to each other. Each pixel may include a photodiode, a comparator coupled to the photodiode, and a reset transistor coupled to the photodiode.

Additionally, the pair of spaced electrical conductors may comprise parallel spaced electrical conductors. The pair of spaced electrical conductors may be vertically spaced.

In some embodiments, the circuitry may further comprise a processor, and readout circuitry coupled between the plurality of pixel line pairs and the processor. The readout circuitry may comprise first and second transistors coupled to each pair of the plurality of pixel line pairs, an amplifier coupled to the second transistor, and logic circuitry coupled downstream from the amplifier. The IC image sensor device may further comprise a substrate, and the plurality of pixel line pairs may be carried by a periphery of the substrate.

Another aspect is directed to a method for making an IC image sensor device. The method may comprise forming a plurality of image sensing IC pixels in an array, and forming a plurality of pixel line pairs coupled to the plurality of image sensing IC pixels. The method may include coupling circuitry to the plurality of pixel line pairs and configured to operate the array in a global shutter mode. Each pair of the plurality of pixel line pairs may comprise a pair of spaced electrical conductors having at least one twist therein.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

Figure 1A:
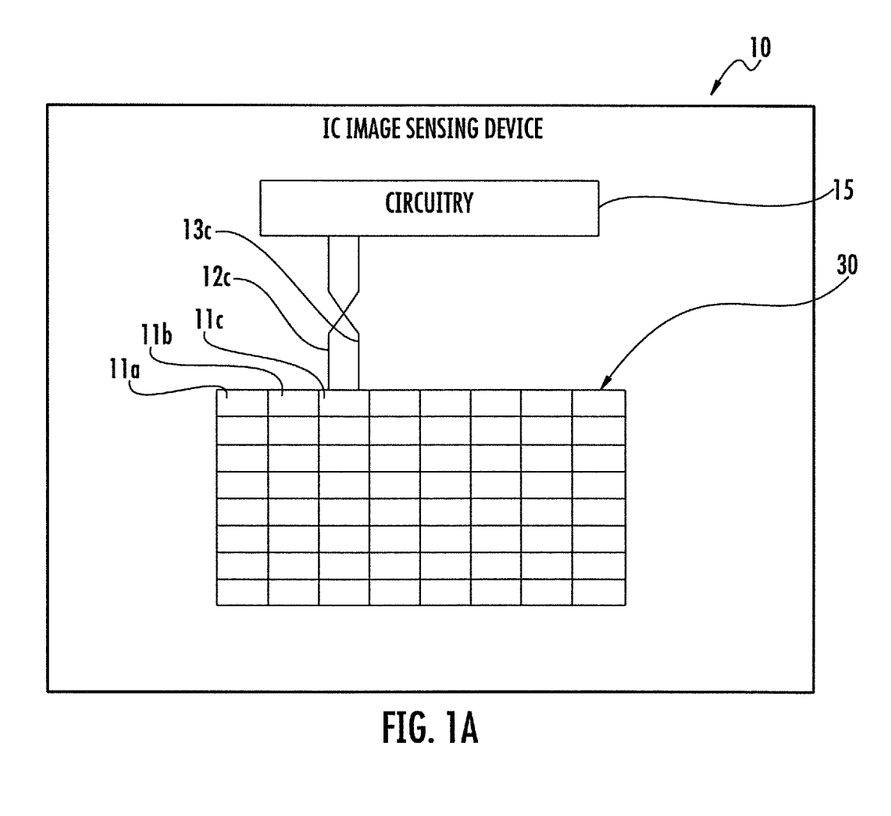
FIG. 1A is a schematic diagram of an IC image sensor device, according to the present disclosure.
Figure 1B:
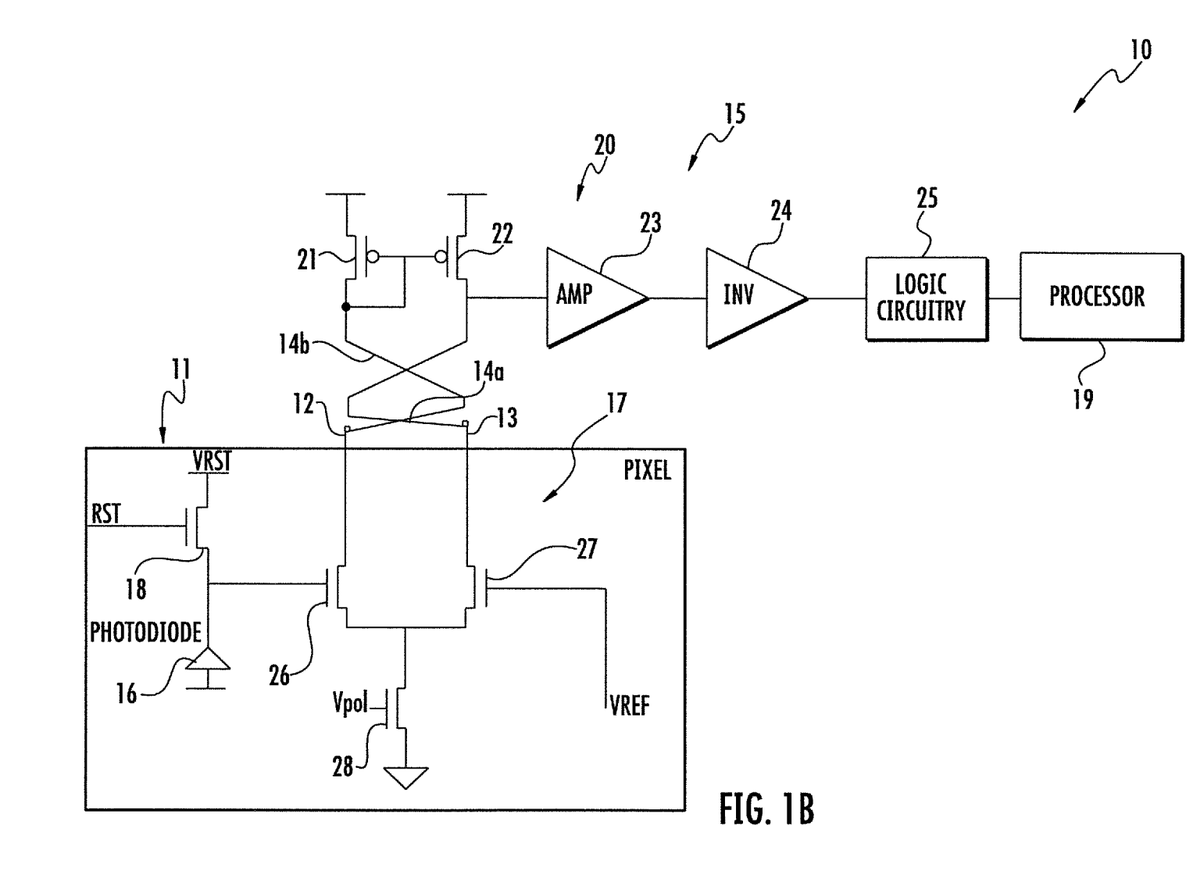
FIG. 1B is a detailed schematic diagram of an IC image sensor device, according to the present disclosure.
Figure 2A:
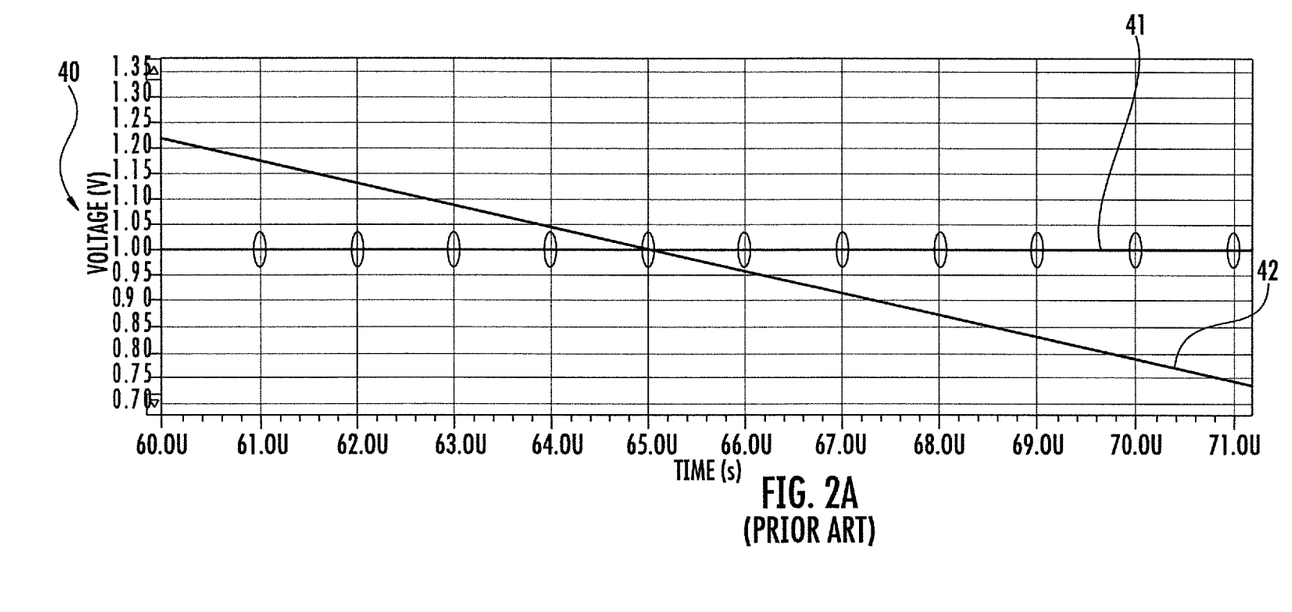
FIGS. 2A-2D are signal diagrams from an IC image sensor device, according to the prior art.
Figure 2B:
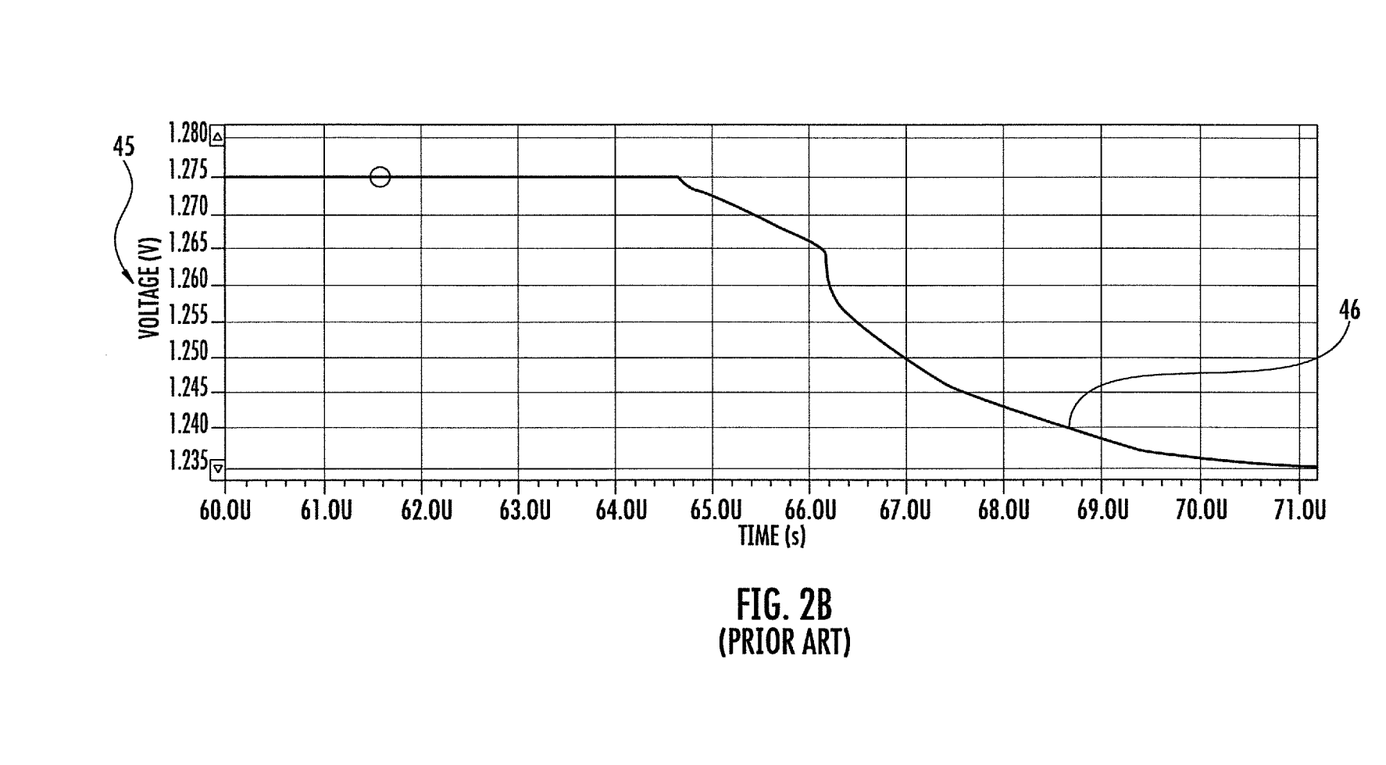
Figure 2C:
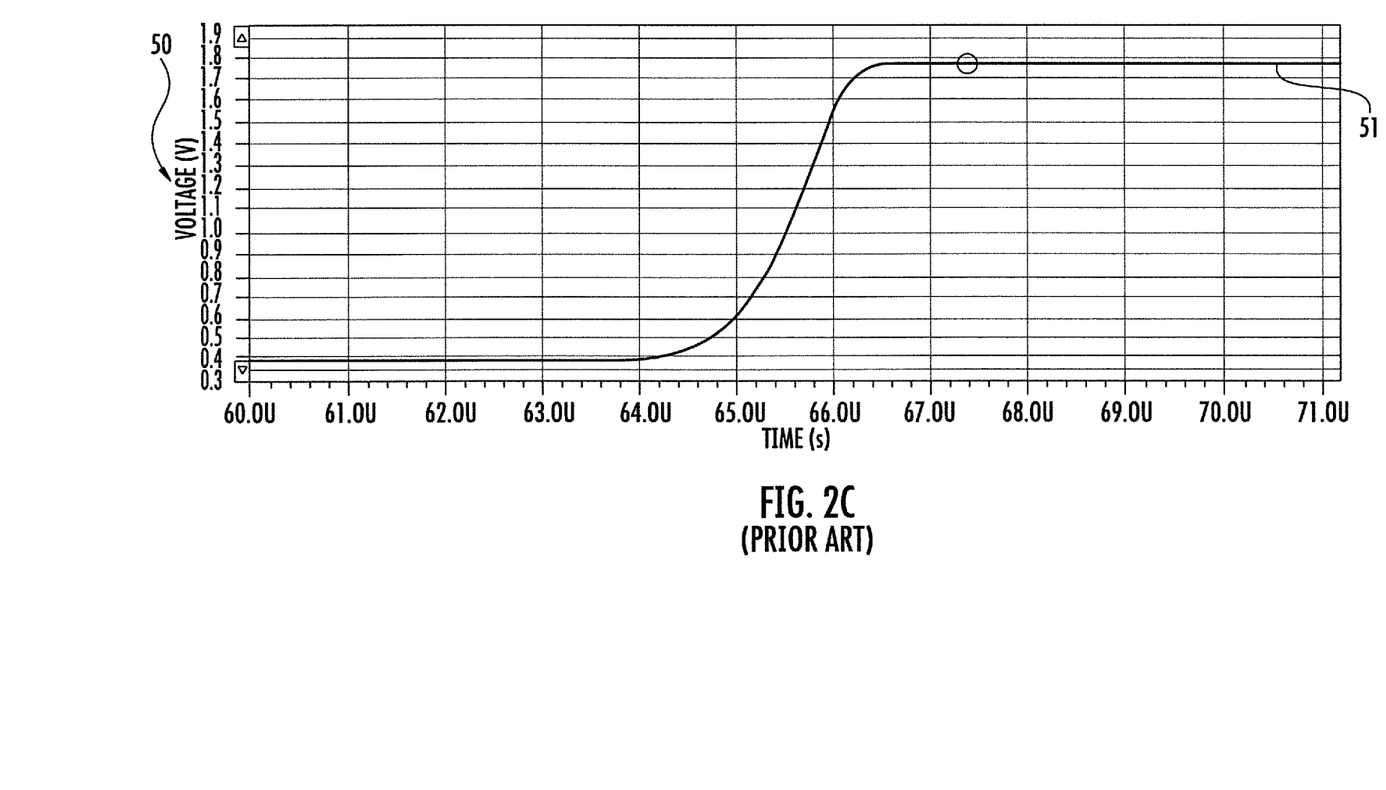
Figure 2D:
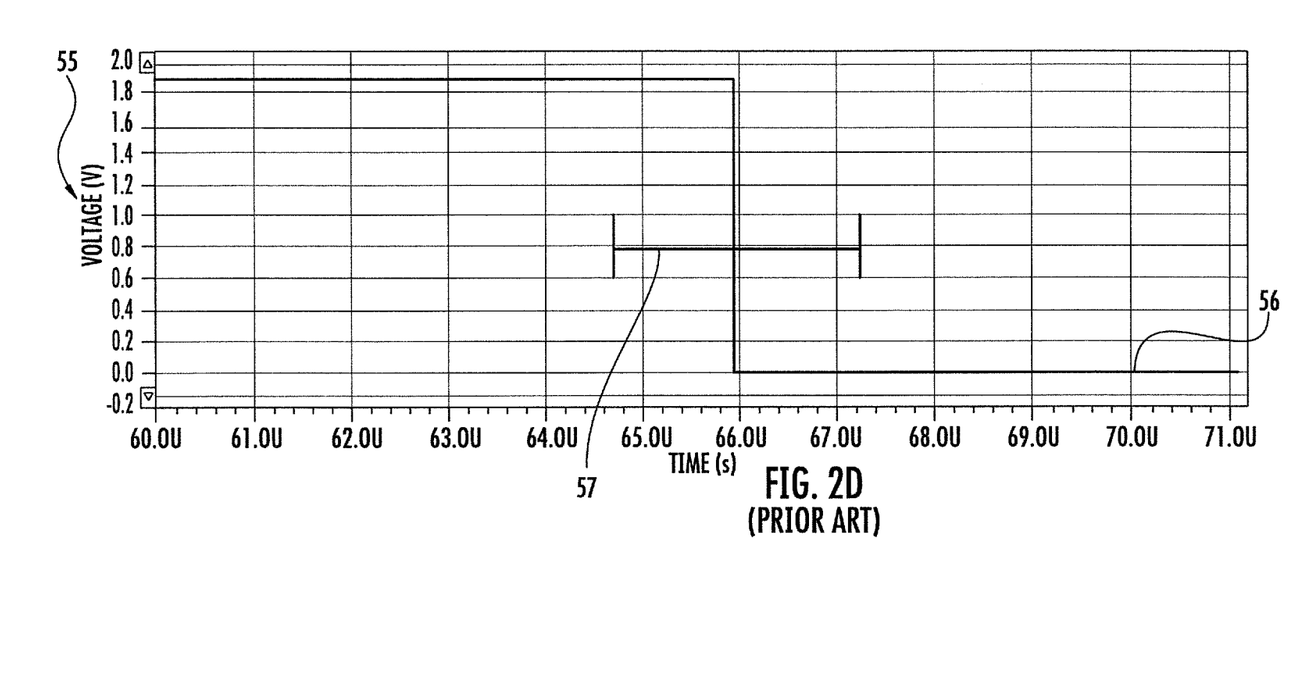
Figure 3A:
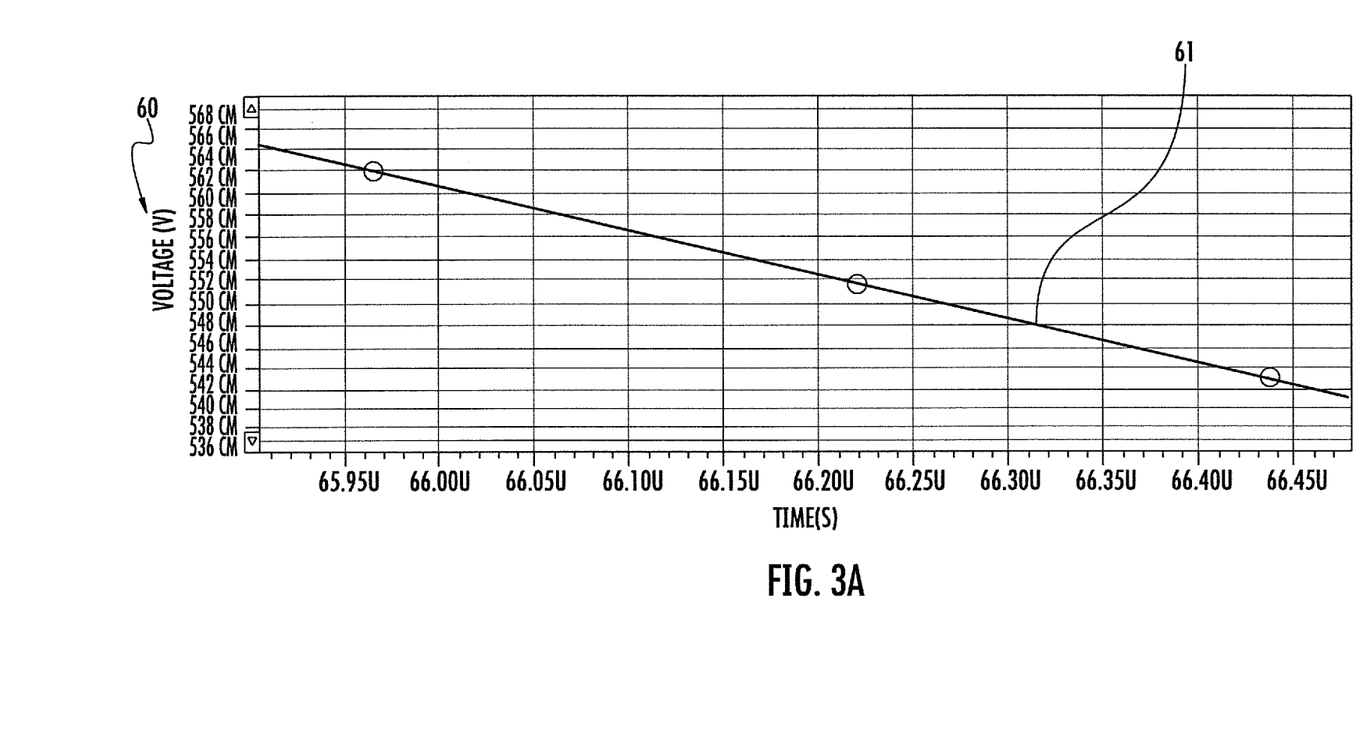
FIGS. 3A-3C are signal diagrams from the IC image sensor device of FIG. 1B.
Figure 3B:
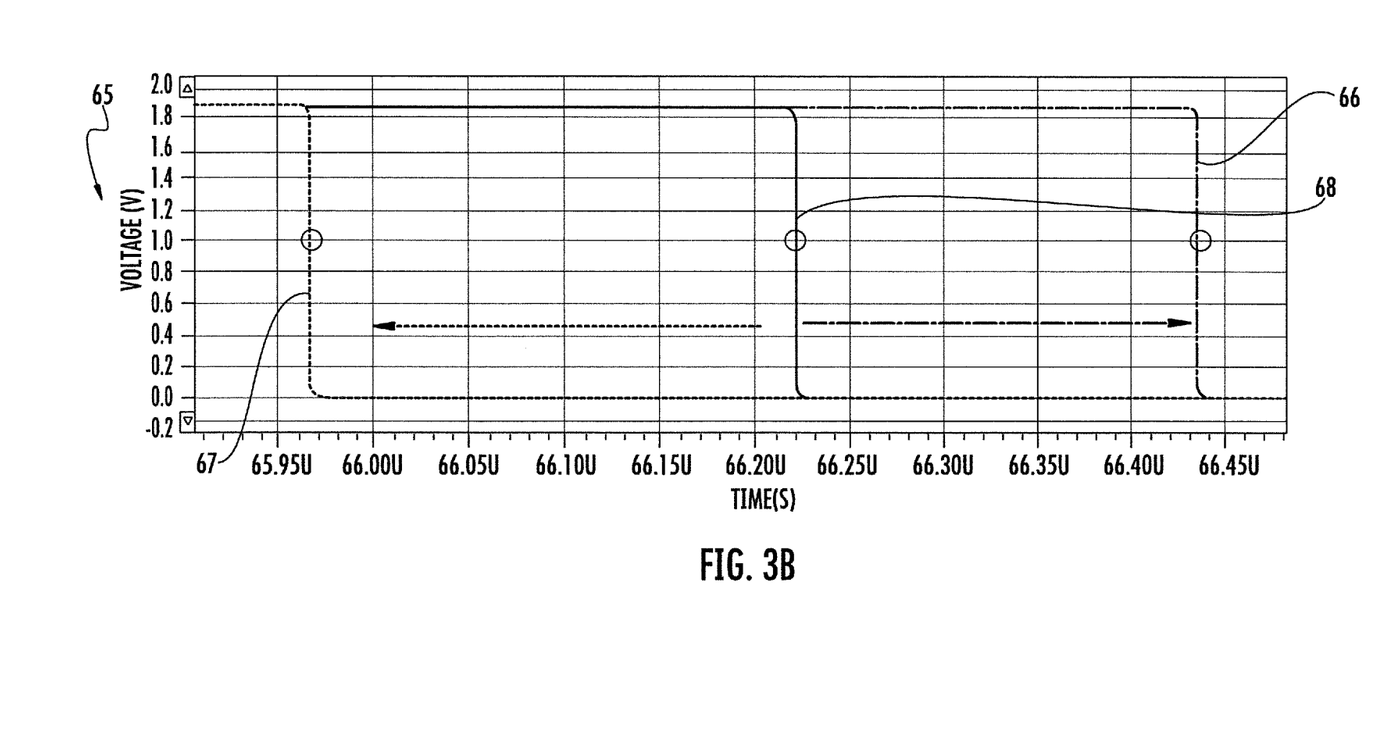
Figure 3C:
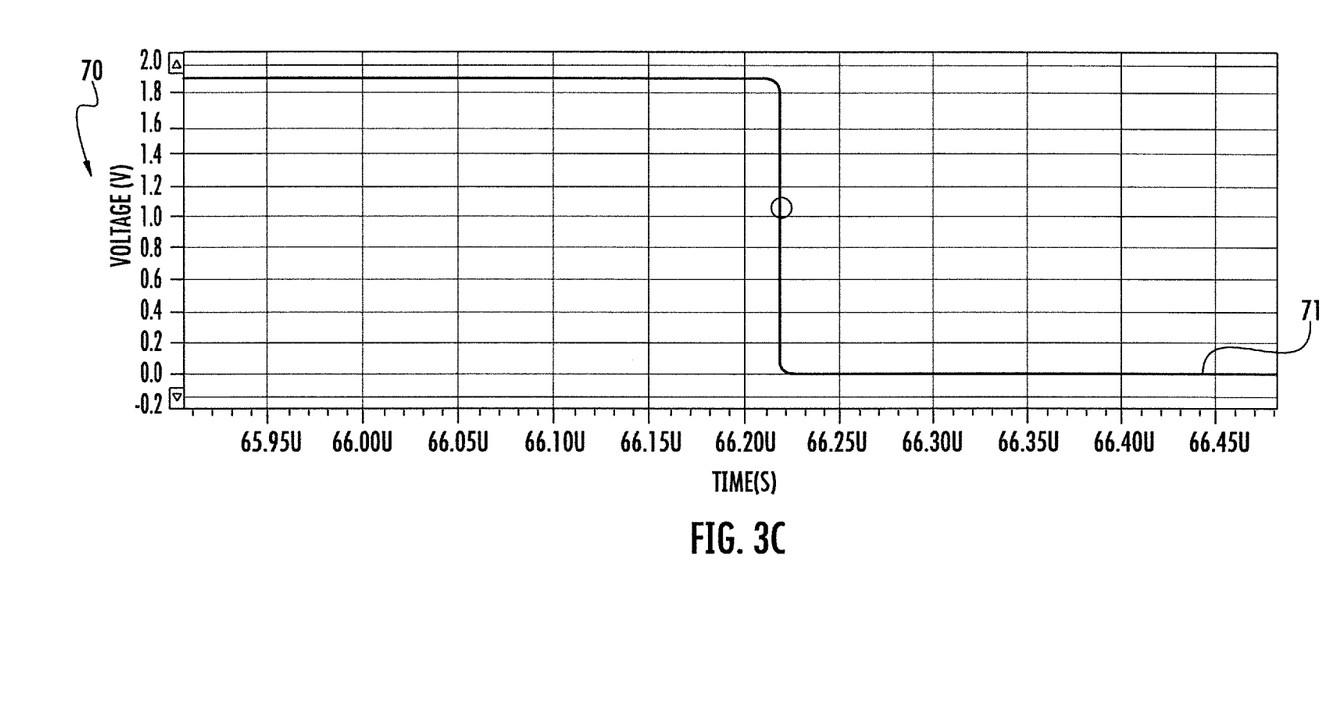

Referring initially to FIGS. 1A-1B, an IC image sensor device 10 according to the present disclosure is now described. The IC image sensor device 10 illustratively includes a plurality of image sensing IC pixels 11a-11c arranged in an array 30 of rows and columns, and a plurality of pixel line pairs 12, 13 respectively coupled to the plurality of image sensing IC pixels. In other words, each image sensing IC pixel 11a-11c has a dedicated pixel line pair 12, 13.

For drawing clarity, the array 30 includes 64 image sensing IC pixels 11a-11c, but it should be appreciated that the array could include many millions of image sensing IC pixels (e.g. 20 Megapixels). Also, for drawing clarity, only a single pair of pixel lines 12c, 13c is depicted, but it should be appreciated to each IC image sensing pixel 11a-11c includes a separate pair of pixel lines. Also, although only one pixel 11 is depicted in detail in FIG. 1B, each IC image sensing pixel 11a-11c includes identical structure.

The IC image sensor device 10 illustratively includes circuitry 15 coupled to the plurality of pixel line pairs 12, 13 and configured to operate the array 30 in a global shutter mode. As will be appreciated, in the global shutter mode, all image sensing IC pixels 11a-11c are read at nearly the same time.

Each pair of the plurality of pixel line pairs 12, 13 illustratively includes a pair of spaced electrical conductors (e.g. copper, aluminum). In the illustrated embodiment, the pair of spaced electrical conductors comprises parallel spaced electrical conductors.

Figure 4:
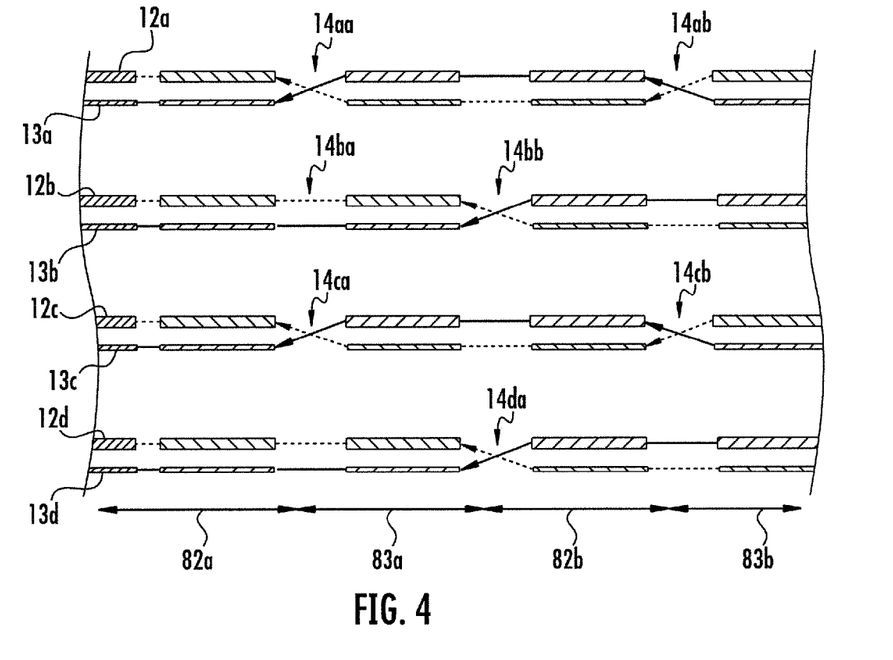
FIG. 4 is a schematic diagram of the pixel line pairs from the IC image sensor device of FIG. 1B.

The pair of spaced electrical conductors illustratively includes first and second twists 14a-14b therein. In FIGS. 1A and 1B, only two twists 14a-14b are depicted for clarity, but it should be appreciated that there can be more than the illustrated two twists (FIG. 4).

Each pixel 11a-11c illustratively includes a photodiode 16, a comparator 17 coupled to the photodiode, and a reset transistor 18 coupled to the photodiode. In other embodiments, the pixel 11a-11c may alternatively comprise other sensing devices, such as a single photon avalanche diode (SPAD) or a micro bolometer. The reset transistor 18 includes a control terminal coupled to a reset control signal RST, a first conduction terminal coupled to a reset voltage VRST, and a second conduction terminal coupled to a cathode of the photodiode 16. The comparator 17 illustratively includes a first transistor 26 having a control terminal coupled between the cathode of the photodiode 16 and the second conduction terminal of the reset transistor 18 (i.e. defining an integration node of the comparator 17), a first conduction terminal, and a second conduction terminal coupled to the first pixel line 12.

The comparator 17 illustratively includes a second transistor 27 having a control terminal coupled to a reference voltage $V_{REF}$, a first conduction terminal coupled to the first conduction terminal of the first transistor 26, and a second conduction terminal coupled to the second pixel line 13. The comparator 17 illustratively includes a third transistor 28 having a control terminal coupled to a voltage $V_{pol}$, a first conduction terminal coupled to a second reference voltage (e.g. ground), and a second conduction terminal coupled between the first conduction terminals of the first and second transistors 26, 27 of the comparator.

The circuitry 15 illustratively includes a processor 19, and readout circuitry 20 coupled between the plurality of pixel line pairs and the processor. It should be appreciated that some of readout circuitry 20 may be shared among more than one pixel 11a-11c, such as a flip-flop circuit. The readout circuitry 20 illustratively includes first and second transistors 21, 22 respectively coupled to each pair of the plurality of pixel line pairs 12, 13, an amplifier 23 coupled to the second transistor (in some embodiments, the amplifier is omitted), an inverter 24 coupled to the amplifier, and logic circuitry 25 coupled downstream from the amplifier and inverter. The first transistor 21 includes a control terminal, a first conduction terminal coupled to the second pixel line 13 and the control terminal (i.e. diode connected), and a second conduction terminal coupled to a supply voltage. The second transistor 22 includes a control terminal coupled to the control terminal of the first transistor 21, a first conduction terminal coupled to the first pixel line 12, and a second conduction terminal coupled to a supply voltage.

Figure 5:
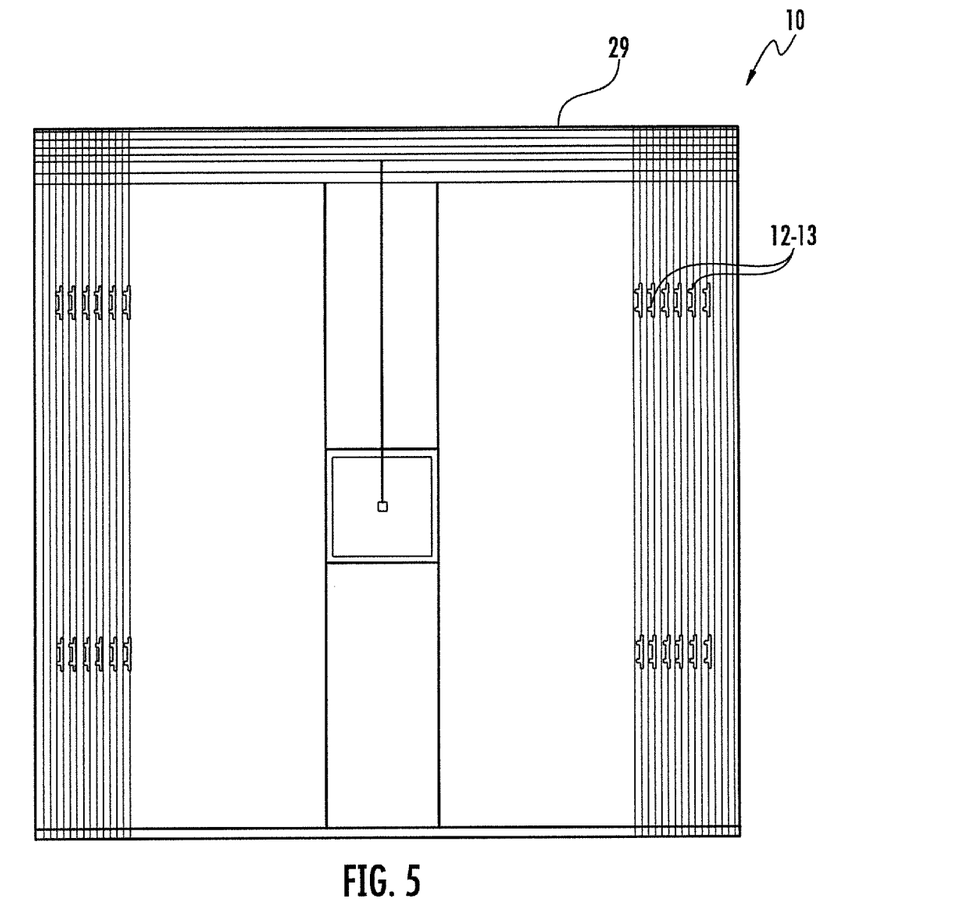
FIG. 5 is a schematic circuit diagram of an example embodiment of the IC image sensor device of FIG. 1B.
Figure 6:
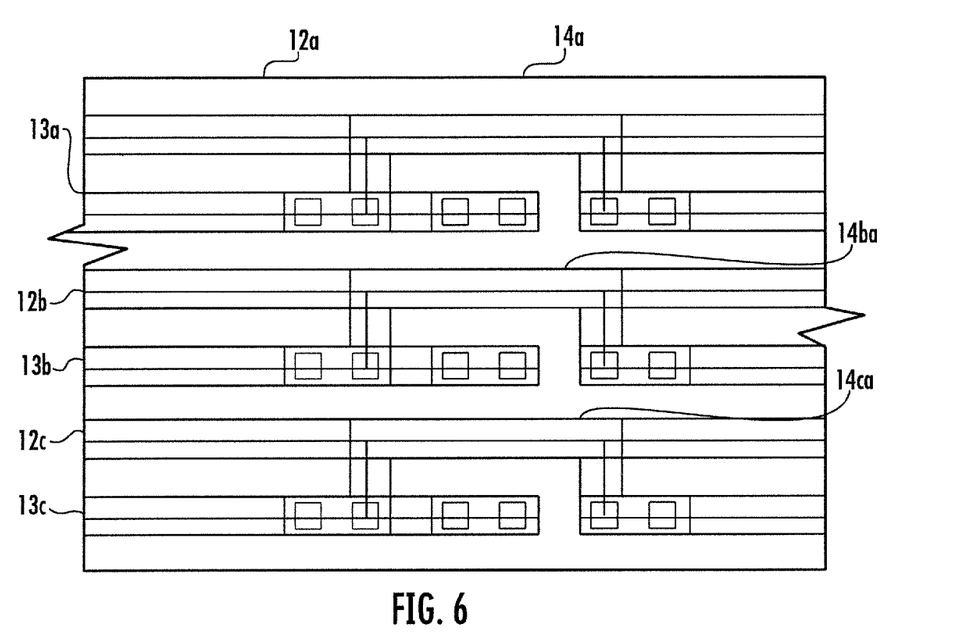
FIG. 6 is an enlarged view of a portion of the schematic circuit diagram of FIG. 5.

Referring now additionally to FIGS. 4-6, respective twists 14aa-14da in adjacent pixel line pairs 12a-12d, 13a-13d are in staggered relation to each other. In advantageous embodiments, all adjacent twists 14aa-14da are in staggered arrangement. Also, in the illustrated example, the spacing between the twists 14aa-14da is about 30 micrometers, but this can vary depending on the design and application. The IC image sensor device illustratively includes a substrate 29, and the plurality of pixel line pairs 12, 13 is carried by a periphery of the substrate.

Advantageously, the IC image sensor device 10 may reduce self-interference in the plurality of pixel line pairs 12, 13 without adding insulation, spacing, or shielding. This is particularly important in mobile applications, where IC real estate is reduced and pixel density and space is increasing. Indeed, in typical approaches to unwanted coupling in pixel lines, the adding insulation, spacing, or shielding add cost and space consumption, all highly undesirable. Using the twists 14aa-14da, the IC image sensor device may cancel the coupling between the plurality of pixel line pairs 12, 13, allowing for more dense IC designs.

Another aspect is directed to a method for making an IC image sensor device 10. The method may comprise forming a plurality of image sensing IC pixels 11a-11c arranged in an array 30, and forming a plurality of pixel line pairs 12, 13 coupled to the plurality of image sensing IC pixels. The method may include coupling circuitry 15 to the plurality of pixel line pairs 12, 13 and configured to operate the array 30 in a global shutter mode. Each pair of the plurality of pixel line pairs 12, 13 may comprise a pair of spaced electrical conductors having at least one twist 14 therein.

Referring now to FIGS. 2A-3C and 7A-7B, diagrams 40, 45, 50, 55 illustrate simulations of the operation of a typical IC image sensor device (having similar structure but without the twist in the pixel lines), and diagrams 60, 65, 70, 80, 85 illustrate simulations of the operation of the IC image sensor device 10.

In particular, in the typical IC image sensor device, curves 41, 42, 46, 51, & 56 respectively represent the reference voltage, the voltage signal on the integration node (when the reference voltage crosses the integration node, the comparator would switch), the voltage signal on first pixel line 12 (all mirror current goes on the first pixel line, so the tension decreases by −40 mV), the voltage signal on second pixel line 13 (current of the second pixel line is canceled, tension increases +1.4V), and the voltage signal at the inverter (after the signal is reformatted, the digital signal is stored). The interval 57 shows the possible delta error in the signal.

Figure 7A:
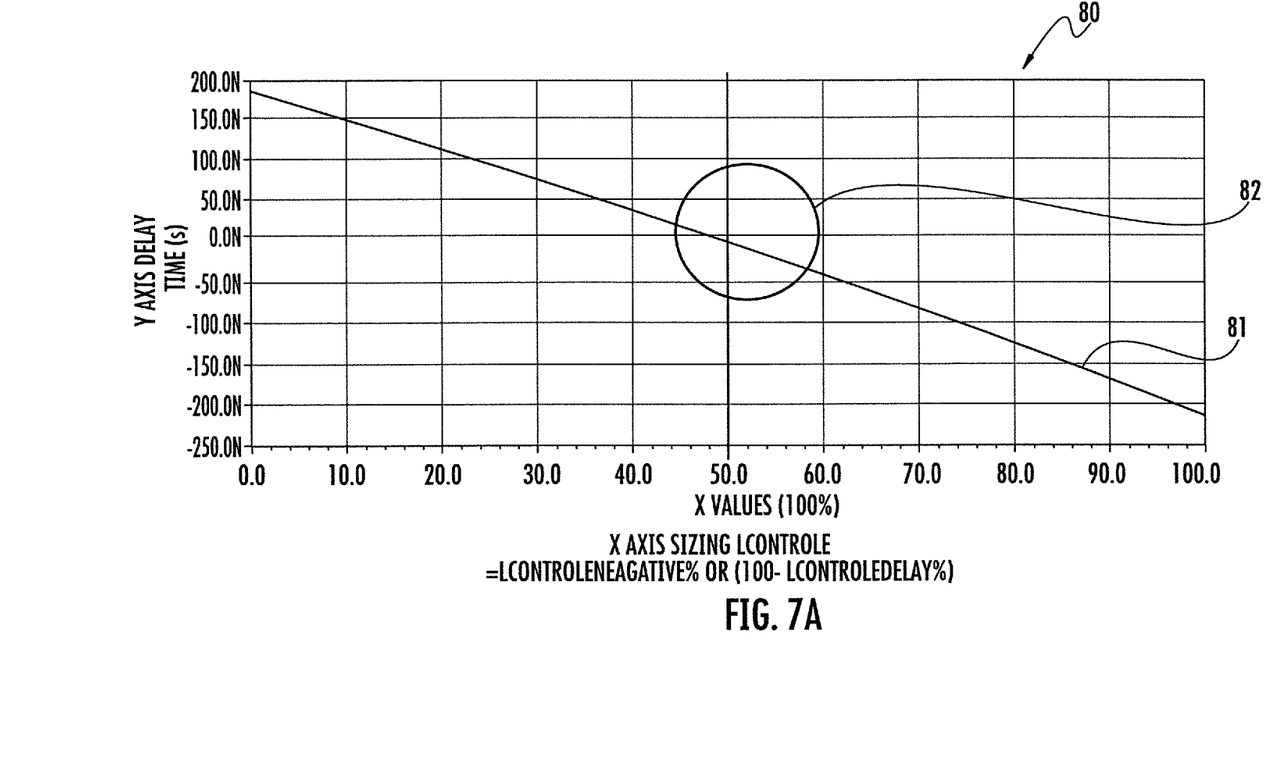
FIGS. 7A-7B are signal diagrams from the IC image sensor device of FIG. 1B.
Figure 7B:
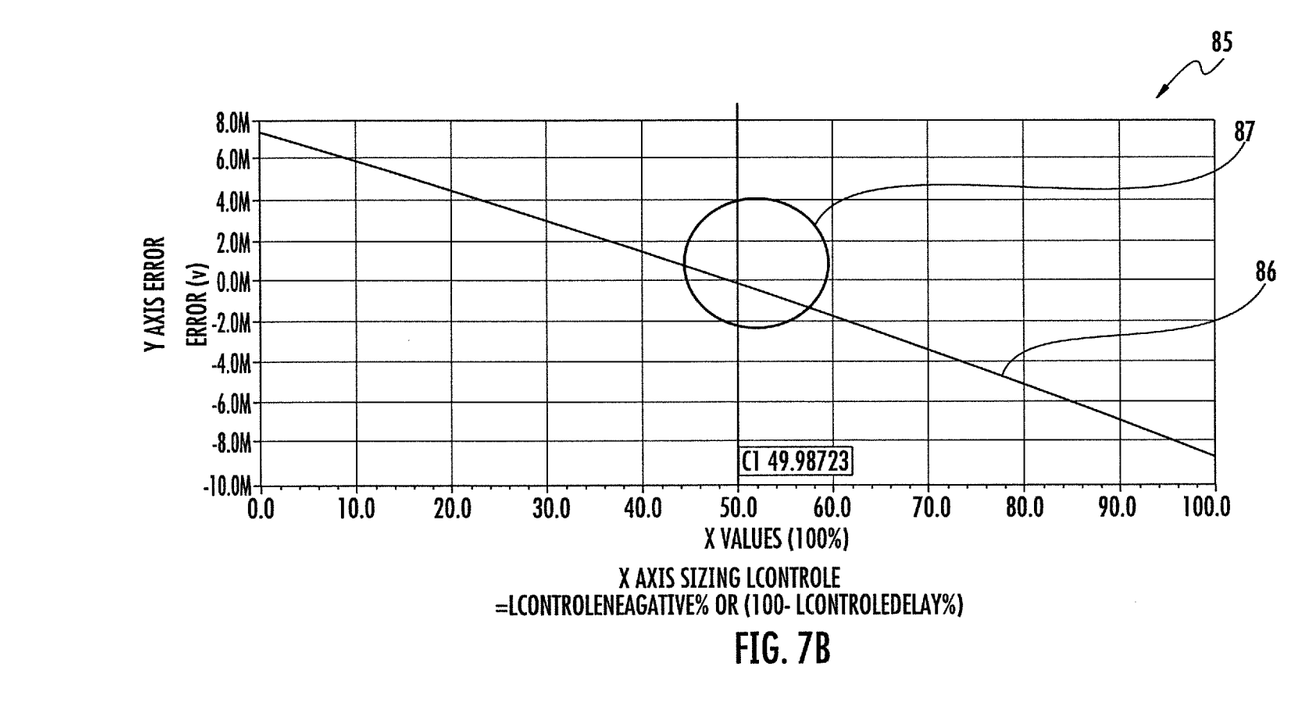

In particular, in the IC image sensor device 10, curves 61, 66, 67, 68, & 71 respectively represent the reference voltage $V_{REF}$, the voltage signal for coupling under the same pixel line (+8.7 mV), the voltage signal for coupling under a different pixel line (−10.1 mV), and the voltage signal for coupling with a twisted line (−0.1 mV), i.e. the actual pixel signal. In particular, in the IC image sensor device 10, curves 81 and 86 respectively represent delay and error in the pixel signal. In this exemplary simulation, the error and delay are totally canceled with a relative length of LcontroleNegative (FIG. 4 82a-82b) of 49.987% and LcontroleDelay (FIG. 4 83a-83b) of 50.013%, as shown in FIGS. 7A-7B. Highlighted circles 82 and 87 illustrate the cancellation performance.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An integrated circuit (IC) image sensor device comprising:
   a plurality of image sensing IC pixels arranged in an array;

a plurality of pixel line pairs coupled to said plurality of image sensing IC pixels, each image sensing IC pixel being directly coupled to a respective pixel line pair; and circuitry coupled to said plurality of pixel line pairs and configured to operate said array in a global shutter mode;

each pair of said plurality of pixel line pairs comprising a pair of spaced electrical conductors having at least one twist therein.

2. The IC image sensor device of claim 1 wherein the at least one twist comprises a plurality thereof.

3. The IC image sensor device of claim 1 wherein respective twists in adjacent pixel line pairs are in staggered relation to each other.

4. The IC image sensor device of claim 1 wherein each pixel comprises:
a photodiode;
a comparator coupled to said photodiode; and
a reset transistor coupled to said photodiode.

5. The IC image sensor device of claim 1 wherein said pair of spaced electrical conductors comprises parallel spaced electrical conductors.

6. The IC image sensor device of claim 1 wherein said pair of spaced electrical conductors are vertically spaced.

7. The IC image sensor device of claim 1 wherein said circuitry further comprises a processor, and readout circuitry coupled between said plurality of pixel line pairs and said processor.

8. The IC image sensor device of claim 7 wherein said readout circuitry comprises:
first and second transistors coupled to each pair of said plurality of pixel line pairs;
an amplifier coupled to said second transistor; and
logic circuitry coupled downstream from said amplifier.

9. The IC image sensor device of claim further comprising a substrate; and wherein said plurality of pixel line pairs are carried by a periphery of said substrate.

10. An integrated circuit (IC) image sensor device comprising:
a plurality of image sensing IC pixels arranged in an array;
a plurality of pixel line pairs coupled to said plurality of image sensing IC pixels, each image sensing IC pixel being directly coupled to a respective pixel line pair; and
circuitry coupled to said plurality of pixel line pairs and configured to operate said array in a global shutter mode;
each pair of said plurality of pixel line pairs comprising a pair of spaced electrical conductors having a plurality of twists therein, respective twists in adjacent pixel line pairs being in staggered relation to each other.

11. The IC image sensor device of claim 10 wherein each pixel comprises:
a photodiode;
a comparator coupled to said photodiode; and
a reset transistor coupled to said photodiode.

12. The IC image sensor device of claim 10 wherein said pair of spaced electrical conductors comprises parallel spaced electrical conductors.

13. The IC image sensor device of claim 10 wherein said pair of spaced electrical conductors are vertically spaced.

14. The IC image sensor device of claim 10 wherein said circuitry further comprises a processor, and readout circuitry coupled between said plurality of pixel line pairs and said processor.

15. The IC image sensor device of claim 14 wherein said readout circuitry comprises:
first and second transistors coupled to each pair of said plurality of pixel line pairs;
an amplifier coupled to said second transistor; and
logic circuitry coupled downstream from said amplifier.

16. The IC image sensor device of claim 10 further comprising a substrate; and wherein said plurality of pixel line pairs are carried by a periphery of said substrate.

17. A method for making an integrated circuit (IC) image sensor device, the method comprising:
forming a plurality of image sensing IC pixels in an array;
forming a plurality of pixel line pairs coupled to the plurality of image sensing IC pixels, each image sensing IC pixel being directly coupled to a respective pixel line pair; and
coupling circuitry to the plurality of pixel line pairs and configured to operate the array in a global shutter mode, each pair of the plurality of pixel line pairs comprising a pair of spaced electrical conductors having at least one twist therein.

18. The method of claim 17 wherein the at least one twist comprises a plurality thereof.

19. The method of claim 17 further comprising forming respective twists in adjacent pixel line pairs in staggered relation to each other.

20. The method of claim 17 wherein each pixel comprises:
a photodiode;
a comparator coupled to the photodiode; and
a reset transistor coupled to the photodiode.

21. The method of claim 17 wherein the pair of spaced electrical conductors comprises parallel spaced electrical conductors.

22. The method of claim 17 wherein the pair of spaced electrical conductors are vertically spaced.

23. The method of claim 17 wherein the circuitry further comprises a processor, and readout circuitry coupled between the plurality of pixel line pairs and the processor.

24. The method of claim 23 wherein the readout circuitry comprises:
first and second transistors coupled to each pair of the plurality of pixel line pairs;
an amplifier coupled to the second transistor; and
logic circuitry coupled downstream from the amplifier.

* * * * *